US009004084B2

(12) United States Patent
Lim et al.

(10) Patent No.: US 9,004,084 B2
(45) Date of Patent: Apr. 14, 2015

(54) METHOD AND APPARATUS FOR REMOVING WASTE FROM A SOILED CONTAINER

(75) Inventors: Lay-Swee Lim, Burnaby (CA); Tyrone Chao, Burnaby (CA); William Hayter, Vancouver (CA); John Walker, New Westminster (CA)

(73) Assignee: Northwestern Systems Corp., Delta, BC (CA)

( * ) Notice: Subject to any disclaimer, the term of this patent is extended or adjusted under 35 U.S.C. 154(b) by 782 days.

(21) Appl. No.: 13/272,944

(22) Filed: Oct. 13, 2011

(65) Prior Publication Data

US 2013/0092187 A1    Apr. 18, 2013

(51) Int. Cl.
| | | |
|---|---|---|
| *B08B 3/00* | (2006.01) | |
| *B08B 9/087* | (2006.01) | |
| *B65G 65/23* | (2006.01) | |

(52) U.S. Cl.
CPC . *B08B 3/00* (2013.01); *B08B 9/087* (2013.01); *B65G 65/23* (2013.01)

(58) Field of Classification Search
None
See application file for complete search history.

(56) References Cited

U.S. PATENT DOCUMENTS

| | | | |
|---|---|---|---|
| 3,098,554 A | 7/1963 | Zeligowsky | |
| 3,915,284 A | 10/1975 | Knockeart et al. | |
| 3,915,310 A | 10/1975 | Wood | |
| 3,990,571 A | 11/1976 | Kitterman et al. | |
| 4,793,463 A | 12/1988 | Kane | |
| 4,890,717 A | 1/1990 | Kane | |
| 5,771,840 A | 6/1998 | Pelletier | |
| 5,794,789 A | 8/1998 | Payson et al. | |
| 5,988,054 A | 11/1999 | Wieglus | |
| 6,394,033 B1 | 5/2002 | Trogstam et al. | |
| 6,680,452 B2 | 1/2004 | Takizawa | |
| 6,711,461 B2 | 3/2004 | Flores | |
| 7,114,462 B2 | 10/2006 | Austin et al. | |
| 7,325,667 B1 | 2/2008 | Damick et al. | |
| 7,703,596 B1 | 4/2010 | Grollitsch | |
| 2009/0282629 A1 | 11/2009 | Arrington | |
| 2010/0094454 A1 | 4/2010 | Depot et al. | |
| 2010/0219042 A1 | 9/2010 | Gales et al. | |

FOREIGN PATENT DOCUMENTS

| | | |
|---|---|---|
| EP | 0 847 813 A1 | 6/1998 |
| EP | 1800766 | 7/2008 |
| GB | 824962 | 12/1959 |
| GB | 1203977 | 11/1967 |
| WO | WO 01/24618 | 4/2001 |

*Primary Examiner* — Eric Golightly
(74) *Attorney, Agent, or Firm* — Kilpatrick Townsend & Stockton LLP

(57) ABSTRACT

An apparatus and method for removing waste from a soiled container that houses laboratory animals and has an opening is disclosed. The apparatus includes a conveyor having a receiving end for receiving containers from a stack of containers. The stack is disposed such that the openings are upwardly oriented. The apparatus also includes a manipulator that aligns with and engages an uppermost container of the stack and causes the uppermost container to be separated from the stack and to be flipped over onto the receiving end of the conveyor such that the opening is downwardly disposed. Waste discarded from the container falls through openings in the conveyor, and a waste receptacle disposed below the conveyor collects the discarded waste. The conveyor advances to transport the container away from the receiving end toward a discharge end of the conveyor.

22 Claims, 9 Drawing Sheets

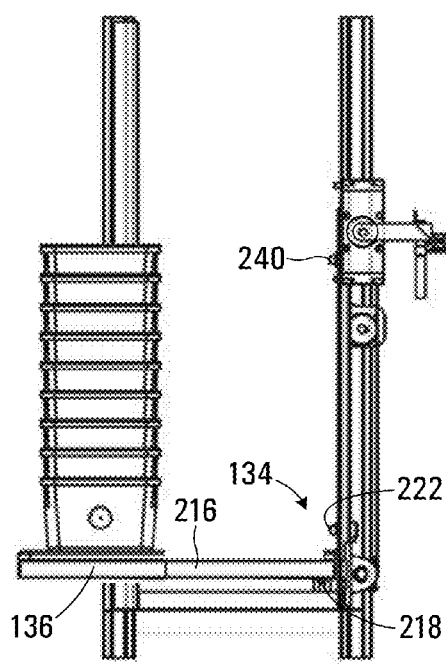
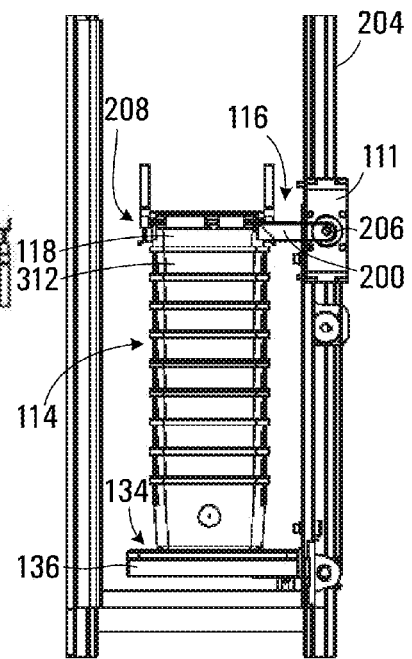
FIG. 3A  FIG. 3B
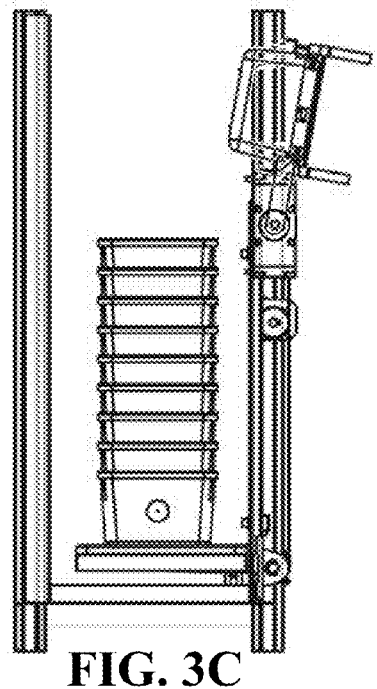
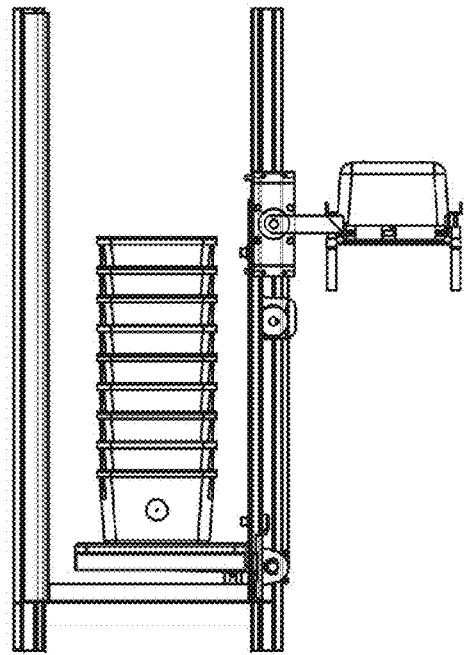
FIG. 3C  FIG. 3D

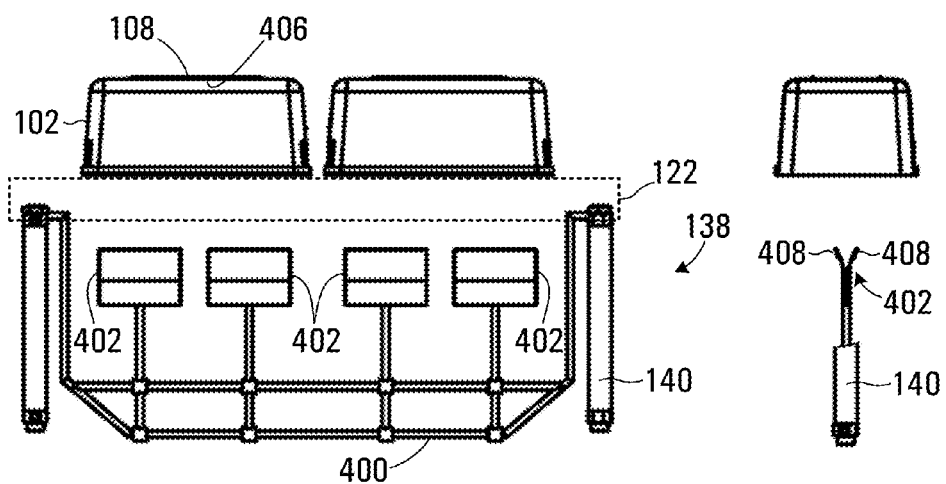
FIG. 6A          FIG. 6C
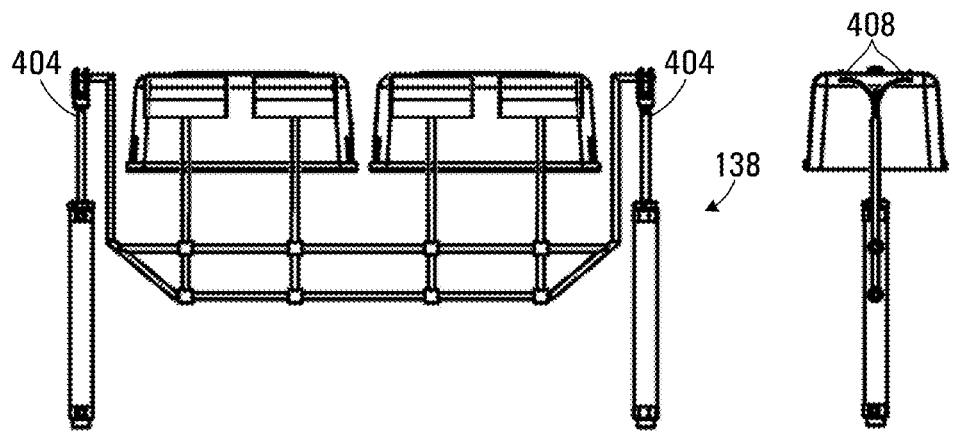
FIG. 6B          FIG. 6D

METHOD AND APPARATUS FOR REMOVING WASTE FROM A SOILED CONTAINER

BACKGROUND OF THE INVENTION

1. Field of Invention

This invention relates generally to processing soiled containers and more particularly to removing waste from a soiled container that is operable to house laboratory animals.

2. Description of Related Art

Laboratories use animals such as rats and/or mice housed in cages for testing and experimentation of pharmaceutical, cosmetic and other products. The cages require frequent cleaning to ensure that waste products and soiled bedding material are removed. Commonly the cage cleaning process involves moving the animal to a clean cage into which fresh bedding material has been dispensed. The soiled cage is then emptied of waste, washed and dried. Large laboratories may have the need for large numbers of cages to house a correspondingly large population of laboratory animals. For example, some laboratories may have the need to clean about 10,000 or more cages per day. Such laboratories may install automated equipment for washing and drying the cages.

The processing of cages still requires substantial manual intervention by laboratory personnel, who are then exposed to animal waste and any other bio-hazards associated with the experimentation being performed on the animals. There remains a need for methods and apparatus that automate processing operations related to maintaining the population of laboratory animals in animal test laboratories and other similar facilities.

SUMMARY OF THE INVENTION

In accordance with one aspect of the invention there is provided an apparatus for removing waste from a soiled container, the container having an opening and being operable to house laboratory animals. The apparatus includes a conveyor having a receiving end for receiving containers from a plurality of stacked containers. The plurality of stacked containers are disposed such that the opening is upwardly oriented. The apparatus also includes a manipulator operable to align with and to engage an uppermost container of the plurality of stacked containers. The manipulator is further operable to cause the uppermost container to be separated from the plurality of stacked containers and to cause the uppermost container to be flipped over onto the receiving end of the conveyor such that the opening is downwardly disposed. The conveyor has a plurality of openings for permitting waste discarded from the container to fall through the openings. The apparatus further includes a waste receptacle disposed below the conveyor for collecting the discarded waste, and the conveyor being operable to advance to transport the container away from the receiving end toward a discharge end of the conveyor.

The plurality of stacked containers may include a plurality of stacked containers in more than one adjacently located vertical stack and the manipulator may be operable to cause uppermost containers from each of the adjacently located vertical stacks to be simultaneously separated from the plurality of stacked containers and flipped over onto the receiving end of the conveyor.

The apparatus may include a controller operably configured to determine whether an uppermost container in one of the more than one adjacently located vertical stacks is missing before causing the manipulator to align with and to engage a uppermost container of the plurality of stacked containers, to cause an operator alert to be initiated, and to pause operation of the conveyor when the containers have been transported to the discharge end of the conveyor to facilitate insertion of a container in place of the missing container.

The controller may be operably configured to determine whether the uppermost container is missing in response to receiving a proximity signal associated with each vertical stack when the uppermost container is present in the vertical stack.

The manipulator may be configured to pivot about a pivot location disposed proximate the receiving end of the conveyor such that the uppermost container is moved in an arc away from a subsequent container in the plurality of stacked containers toward the receiving end of the conveyor.

The manipulator may include a separating actuator operable to extend to cause a subsequent container in the plurality of stacked containers to be forcefully separated from the uppermost container when the subsequent container remains attached to the uppermost container during the separating.

The apparatus may include provisions for causing displacement between the manipulator and the plurality of stacked containers.

The provisions for causing displacement between the manipulator and the plurality of stacked containers may include provisions for lowering the plurality of stacked containers.

The apparatus may include a controller operably configured to determine whether one or more subsequent containers in the plurality of stacked containers remain attached to the uppermost container after the separating, and cause the one or more subsequent containers and the uppermost container to be received at the receiving end of the conveyor and transported to a reject location along the conveyor.

The controller may be operably configured to determine whether the one or more subsequent containers in the plurality of stacked containers remain attached by receiving a signal from a sensor disposed to sense the presence of the one or more subsequent containers.

The apparatus may include a door disposed to one side of the conveyor at the reject location for ejecting the one or more subsequent containers and the uppermost container.

The apparatus may include an ejector actuator operably configured to push the one or more subsequent containers and the uppermost container through the reject door.

The apparatus may include an elevator operable to cause the plurality of stacked containers to be elevated until an upper portion of the uppermost container is aligned with the manipulator.

The apparatus may include a sensor disposed at a height proximate the manipulator and being operable to generate a signal when the upper portion of the uppermost container is aligned with the manipulator.

The apparatus may include an auger disposed in the waste receptacle and being operable to cause the discarded waste to be removed from the waste receptacle.

The waste receptacle may include an exhaust port in fluid communication with the waste receptacle and may further include a blower operable to cause a flow of air to be drawn through the exhaust port to prevent waste from escaping into a surrounding environment.

The apparatus may include a housing enclosing the conveyor and the flow of air may be further operable to cause a negative pressure within the housing.

The apparatus may include a scraper operable to engage at least a surface of the container disposed opposite the opening for removing waste from the at least the surface.

The apparatus may include a controller operably configured to cause the uppermost container to be flipped over onto the receiving end of the conveyor while motion of the conveyor is halted and the controller is operably configured to cause the manipulator to hold the container in the flipped over orientation on the receiving end of the conveyor, and to cause a scraper blade to be extended through one of the openings in the conveyor to engage the surface.

The scraper blade may include a resilient scraper blade.

The resilient scraper blade may include a scraper blade having a pair of generally vertically oriented resilient blades, the resilient blades being operably configured to engage the surface and move apart with respect to each other while being extended thereby scraping the surface.

In accordance with another aspect of the invention there is provided a system for cleaning soiled containers. The system includes the apparatus above and further includes at least one of a washer apparatus disposed to receive the containers from the discharge end of the conveyor for washing the containers, a drier apparatus disposed to receive the washed containers from the washer apparatus and to cause the containers to be dried, and a bedding dispenser apparatus, disposed to receive the dried containers flip the containers to cause the opening to be upwardly disposed for receiving a bedding material.

In accordance with another aspect of the invention there is provided a method for removing waste from a soiled container, the container having an opening and being operable to house laboratory animals. The method involves receiving a plurality of stacked containers proximate a receiving end of a conveyor, the containers being disposed such that the opening is upwardly oriented. The method also involves causing a manipulator to align with and to engage an uppermost container of the plurality of stacked containers, actuating the manipulator to cause the uppermost container to be separated from the plurality of stacked containers and to cause the uppermost container to be flipped over onto the receiving end of the conveyor such that the opening is downwardly disposed. The conveyor has a plurality of openings for permitting waste discarded from the container to fall through the openings. The method also involves collecting the discarded waste while causing the conveyor to be advanced to transport the container away from the receiving end toward a discharge end of the conveyor.

Receiving the plurality of stacked containers may involve receiving a plurality of stacked containers in more than one adjacently located vertical stack and actuating the manipulator may involve actuating the manipulator to cause uppermost containers from each of the adjacently located vertical stacks to be simultaneously separated from the plurality of stacked containers and flipped over onto the receiving end of the conveyor.

The method may involve determining whether an uppermost container in one of the more than one adjacently located vertical stacks is missing before causing the manipulator to align with and to engage a uppermost container of the plurality of stacked containers, causing an operator alert to be initiated, and pausing operation of the conveyor when the containers have been transported to the discharge end of the conveyor to facilitate insertion of a container in place of the missing container.

The determining may involve, for each vertical stack, generating respective signals when the uppermost container is present in the vertical stack.

Actuating the manipulator may involve causing the manipulator to pivot about a pivot location disposed proximate the receiving end of the conveyor such that the uppermost container may be moved in an arc away from a subsequent container in the plurality of stacked containers toward the receiving end of the conveyor.

Actuating the manipulator to cause the uppermost container to be separated from the plurality of stacked containers may involve extending a separating actuator to cause a subsequent container in the plurality of stacked containers to be forcefully separated from the uppermost container when the subsequent container remains attached to the uppermost container during the separating.

Actuating the manipulator to cause the uppermost container to be separated from the plurality of stacked containers may involve causing displacement between the manipulator and the plurality of stacked containers.

Causing displacement between the manipulator and the plurality of stacked containers may involve lowering the plurality of stacked containers.

The method may involve determining whether one or more subsequent containers in the plurality of stacked containers remain attached to the uppermost container after the separating, and causing the one or more subsequent containers and the uppermost container to be received at the receiving end of the conveyor and transported to a reject location along the conveyor.

Determining may involve receiving a signal from a sensor disposed to sense the presence of the one or more subsequent containers.

The method may involve ejecting the one or more subsequent containers and the uppermost container through a door disposed to one side of the conveyor at the reject location.

The ejecting may involve extending an ejector actuator to push the one or more subsequent containers and the uppermost container through the reject door.

Causing the manipulator to align with the uppermost container may involve causing the plurality of stacked containers to be elevated until an upper portion of the uppermost container is aligned with the manipulator.

Causing the plurality of stacked containers to be elevated may involve causing the plurality of stacked containers to be elevated until the upper portion of the uppermost container is detected by a sensor disposed at a height proximate the manipulator.

Collecting the discarded waste may involve receiving the discarded waste in a waste receptacle disposed below the conveyor.

The method may involve operating an auger disposed in the waste receptacle to cause the discarded waste to be removed from the waste receptacle.

The method may involve causing a flow of air to be drawn through an exhaust port of the waste receptacle to prevent waste from escaping into a surrounding environment.

The conveyor may be enclosed in a housing and the flow of air may be further operable to cause a negative pressure within the housing.

The method may involve actuating a scraper to cause at least a surface of the container disposed opposite the opening to be scraped to remove waste from the surface.

Causing the uppermost container to be flipped over may involve causing the uppermost container to be flipped over onto the receiving end of the conveyor while motion of the conveyor is halted and actuating the scraper may involve causing the manipulator to hold the container in the flipped over orientation on the receiving end of the conveyor, and causing a scraper blade to be extended through one of the openings in the conveyor to engage the surface.

Causing the scraper blade to be extended may involve causing a resilient scraper blade to be extended through the one of the openings in the conveyor.

Causing the scraper blade to be extended may involve causing a scraper blade having a pair of generally vertically oriented resilient blades to be extended through the one of the openings in the conveyor, the resilient blades being operably configured to engage the surface and move apart with respect to each other while being extended thereby scraping the surface.

Receiving the plurality of stacked containers may involve receiving a plurality containers stacked on a base and may further involve, after each of the containers have been separated from the base, causing the manipulator to align with and to engage the base and actuating the manipulator to cause the base to be flipped over onto the receiving end of the conveyor.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention,

FIG. 3A-3D are a series of side views of an elevator and a manipulator used in the apparatus shown in FIG. 1;

FIG. 6A is an elevational view of a scraper used in the apparatus shown in FIG. 1 in retracted condition;

FIG. 6B is an elevational view of a scraper used in the apparatus shown in FIG. 1 in an extended condition;

FIG. 6C is a side view of the scraper in the extended condition shown in FIG. 6A;

FIG. 6D is a side view of the scraper in the retracted condition shown in FIG. 6B;

DETAILED DESCRIPTION

Figure 1:
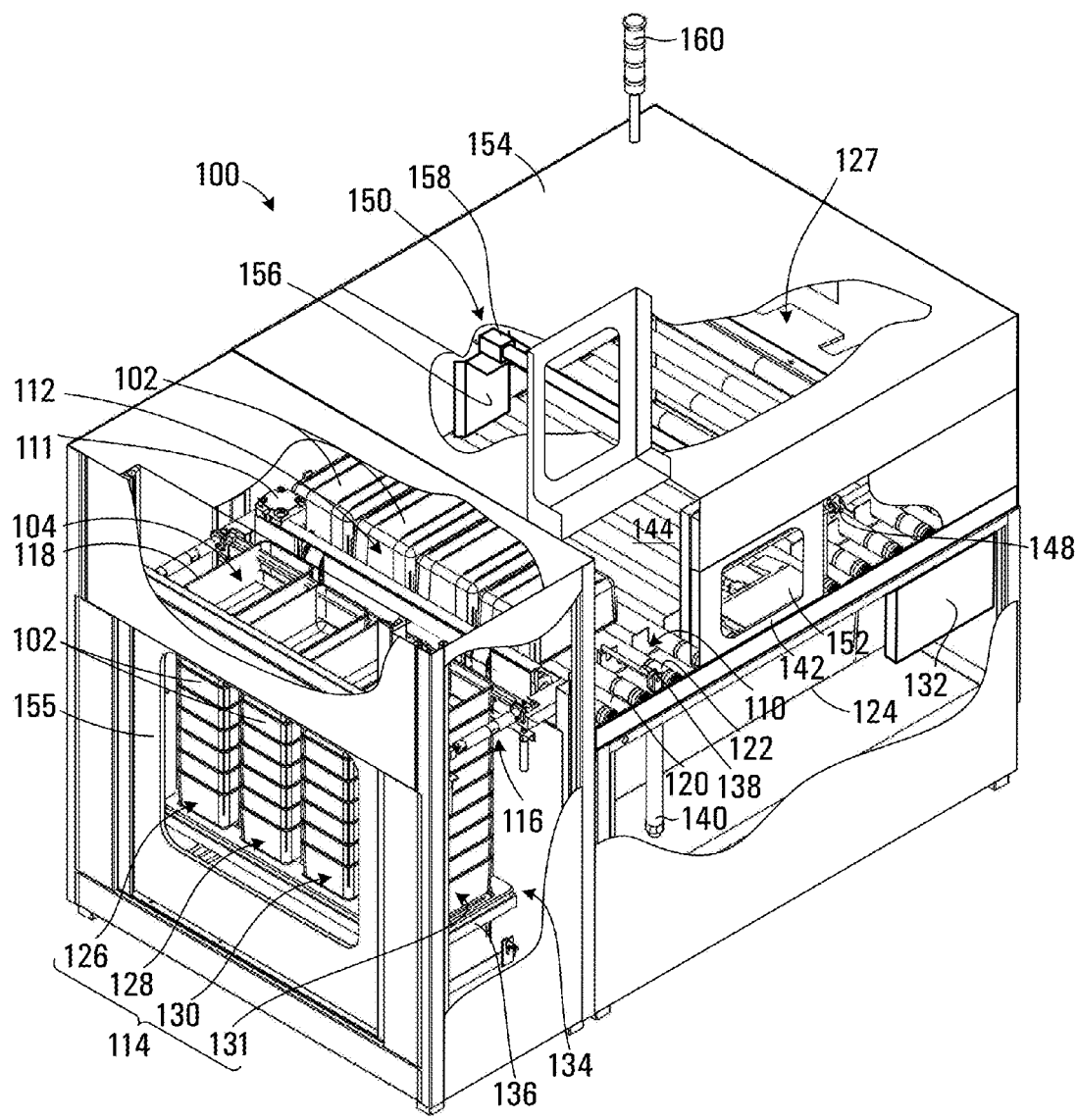
FIG. 1 is a perspective partially cut away view of an apparatus for removing waste from a soiled container in accordance with a first embodiment of the invention.
Figure 2A:
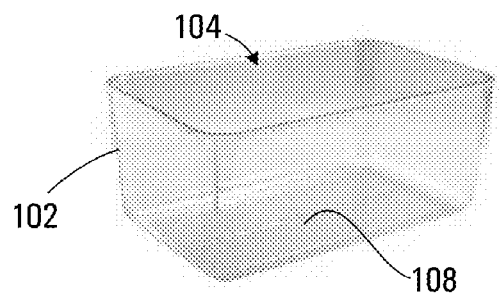
FIG. 2A is a perspective view of a cage bottom container processed by the apparatus shown in FIG. 1.
Figure 2B:
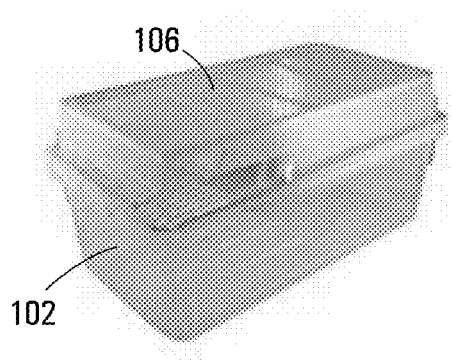
FIG. 2B is a perspective view of a container with a cage top in place for containing a laboratory animal in the container.

Referring to FIG. 1, an apparatus for removing waste from a soiled container in accordance with one embodiment of the invention is shown generally at 100. The container may be a polycarbonate cage bottom used to house laboratory animals such as rats and mice, an example of which is shown at 102 in FIG. 2. Referring to FIG. 2A, the cage bottom container 102 has an opening 104, which is generally rectangular and is configured to receive a lid or cage top 106 (shown in FIG. 2B) for confining the animal within the container. Bedding material may be introduced through the opening 104 to at least partly cover a base 108 of the container 102. In use, the bedding material and interior surfaces of the container 102 become soiled over time and when this occurs the animal is usually transferred to a clean cage and the soiled container is cleaned. Large animal testing laboratories commonly have automated container cleaning facilities to clean and otherwise process large numbers of soiled containers. It is also desirable to minimize handling of soiled cages by laboratory personnel.

In the embodiment shown in FIG. 1, the apparatus 100 includes a conveyor 110 having a receiving end 112 for receiving containers from a plurality of stacked containers 114. In the embodiment shown the plurality of stacked containers 114 include mouse containers in four adjacently located vertical stacks 126, 128, 130, and 131. Rat cages are generally larger than mouse containers, and when processing rat cages the containers 102 may be stacked in two adjacently located vertical stacks. Other cage sizes may be accommodated, as necessary. The plurality of stacked containers 114 are disposed such that the respective openings 104 of the containers 102 that make up the stack are upwardly oriented.

The apparatus 100 also includes a manipulator 116 operable to align with and to engage an uppermost container 118 of the plurality of stacked containers 114. The manipulator 116 is also operable to cause the uppermost container 118 to be separated from the plurality of stacked containers 114 and to cause the uppermost container to be flipped over onto the receiving end 112 of the conveyor 110 such that the opening 104 is downwardly disposed.

The conveyor 110 has a plurality of openings 120 for permitting waste discarded from the container 102 to fall through the openings. In the embodiment shown in FIG. 1, the conveyor 110 in includes a plurality of rollers 122 that are spaced apart to define the openings 120 between adjacent rollers. In one embodiment, some of the rollers 122 comprise integral drive motors (not shown) and the driven rollers are coupled to adjacent rollers by o-rings disposed in grooves for imparting a rotating motion to the non-driven rollers to transport the containers 102 away from the receiving end 112 toward a discharge end 127 of the conveyor. In other embodiments the conveyor may comprise a conveyor belt, such as an open mesh stainless steel wire conveyor having mesh openings sized to permit waste to fall through the openings.

The apparatus 100 further includes a waste receptacle 124 disposed below the conveyor 110 for collecting the discarded waste that falls through the openings 120. In one embodiment the waste receptacle 124 includes an auger (not shown), which is operable to cause the discarded waste to be removed from the waste receptacle. The waste receptacle 124 may include an exhaust port in fluid communication with the waste receptacle and the apparatus 100 may further include a blower operable to cause a flow of air to be drawn through the exhaust port to prevent waste from escaping into the environment surrounding the apparatus. The apparatus 100 also includes a housing 154 enclosing the apparatus. In operation the flow of air through the exhaust port is also operable to cause a negative pressure within the housing. The negative pressure prevents contaminants in the waste from escaping into the environment from the housing 154. The apparatus 100 also includes a door 155, which opens vertically to provide access to the apparatus for loading containers. In some embodiments the door 155 may be coupled to a pneumatic actuation cylinder or other actuator for automatic opening and closing. When loading is completed, the door 155 is closed to maintain the negative pressure within the housing 154.

In one embodiment, the discharge end 127 of the conveyor 110 may be in communication with a further processing apparatus, such as a tunnel washer (not shown) disposed to receive the containers 102 and to wash the containers. Similarly, the washer may be in communication with a drier apparatus (also not shown) disposed to receive the washed containers and to cause the containers to be dried. The direr apparatus may further be in communication with a bedding dispenser apparatus (not shown) disposed to receive the dried containers and to flip the containers to cause the opening 104 to be upwardly disposed for receiving bedding material.

In this embodiment, operations of the conveyor 110 and manipulator 116 are controlled by a controller 132. In one embodiment the controller 132 is implemented using a processor circuit such as a microcontroller.

The manipulator 116 is shown in side view in FIG. 3. Referring to FIG. 3B the manipulator 116 includes a manipulator actuator 111 and the manipulator includes arms 200 (only one is visible in FIG. 3) that are pivotably attached to the manipulator actuator at a drive pivot 206 proximate the receiving end 112 of the conveyor 110. In one embodiment, the manipulator actuator 111 comprises a servo motor (not shown) configured to generate a rotational torque at the drive pivot 206 for actuating the arms 200 to move about the pivot. The servo motor of the manipulator actuator 111 may include appropriate gearing and an encoder for sensing a rotational disposition of the arms 200 while being actuated. In other embodiments the manipulator actuator 111 may be implemented using one or more pneumatic rotary actuators coupled to the arms 200 at the drive pivot 206. The arms 200 of the manipulator 116 are configured to move in an arc about the drive pivot 206 (as shown in FIGS. 3B to 3D) for flipping the containers 102 such that the uppermost container 118 is moved in an arc away from a subsequent container in the plurality of stacked containers 114 toward the receiving end 112 of the conveyor 110.

Figure 4:
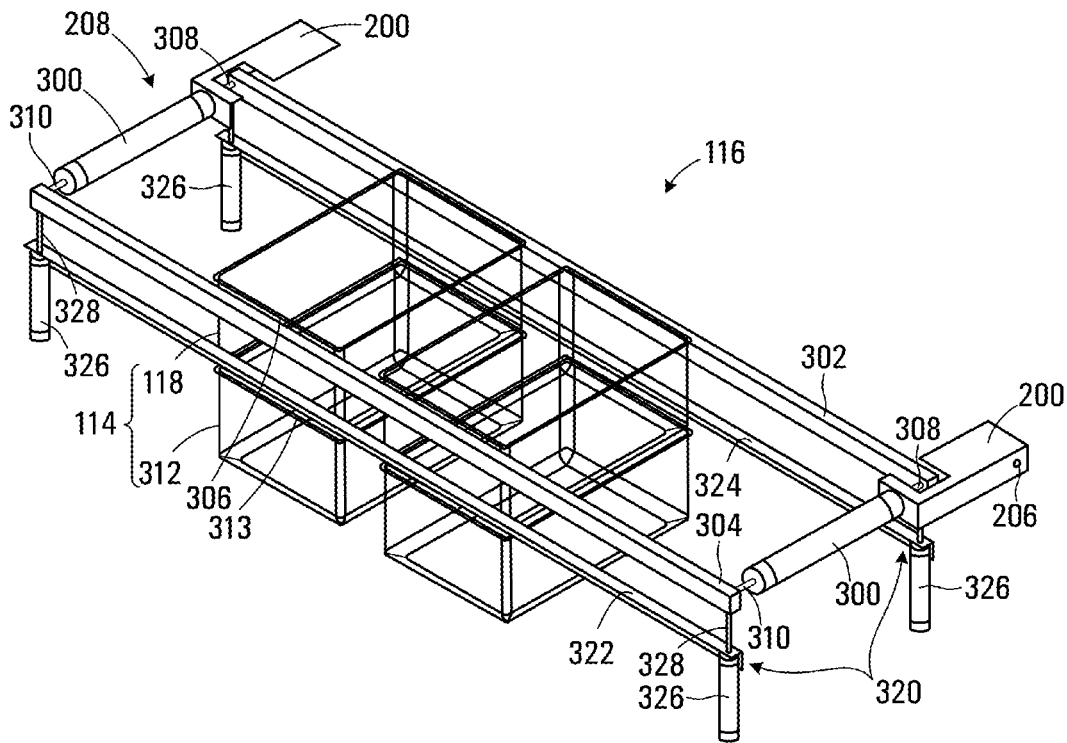
FIG. 4 is a perspective view of the manipulator shown in FIG. 3.

The manipulator 116 also includes a clamp mechanism 208 for engaging the uppermost container 118 of the plurality of stacked containers 114, which in this embodiment includes a subsequent container 312 located in the stack immediately below the uppermost container. The manipulator 116 and clamp mechanism 208 are shown in perspective view in FIG. 4. Referring to FIG. 4, the manipulator 116 includes a pair of clamp actuation cylinders 300 mounted on respective arms 200. The manipulator 116 further includes first and second clamp bars 302 and 304, which extend across the width of the conveyor 110 (shown in FIG. 1) and are disposed to engage the uppermost container 118 under a lip 306 of the container. The clamp actuation cylinders 300 are supported by the respective arms 200 and move in an arc together with the arms. The clamp actuation cylinders 300 are double-ended pneumatically actuated cylinders having respective first rods 308 coupled to the first bar 302 and respective second rods 310 coupled to the second bar 304. Actuation of the cylinder 300 causes the rods 308 and 310 to either retract to cause the clamp bars 302 and 304 to engage the uppermost container 118 or to extend to cause the clamp bars 302 and 304 to release the container. In embodiments where more than one stack of containers is present in the plurality of stacked containers 114 (such as shown in FIG. 1), a plurality of uppermost containers in a top row would be simultaneously engaged by the clamp bars 302 and 304. The pair of clamp actuation cylinders 300 may be actuated by an electrically actuated valve in response to receiving a clamp actuation signal from the controller 132.

The manipulator 116 further includes a separating mechanism 320 for separating the uppermost container 118 from the subsequent container 312 in the stack of containers 114. The separating mechanism 320 includes a pair of separator bars 322 and 324 and two pairs of separator actuator cylinders 326. Each of the separator bars 322 and 324 include a pair of separator actuator cylinders 326 mounted between the separator bar and the corresponding clamp bar 302 or 304. The separator actuator cylinders 326 are operable to extend to cause a subsequent container 312 in the plurality of stacked containers 114 to be forcefully separated from the uppermost container 118 when the subsequent container remains attached to the uppermost container during the separating. The separator actuator cylinders 326 may comprise single-ended pneumatically actuated cylinders having respective rods 328 coupled to the respective separator bars 322 and 324. Actuation of the cylinders 326 when the uppermost container 118 is engaged by the clamp mechanism 208 causes rods 328 of the separator actuator cylinders to extend to push the pair of separator bars 322 and 324 downwardly away from the first and second clamp bars 302 and 304.

In general, the containers 102 are sized such that when stacked, each container 102 in the stack is at least partly received in the subsequent container (i.e. a base 108 of the uppermost container 118 is received inside the opening 104 of the subsequent container 312). Under these conditions, it may occur that two or more containers remain stuck together while being flipped by the manipulator 116, in which case waste will remain trapped within one of the containers and the container will be discharged from the apparatus 100 in a soiled condition. The separator bars 322 and 324 are configured to engage a lip 313 of the subsequent container 312 and force the containers apart prior to flipping by the manipulator 116.

Referring back to FIG. 1, in the embodiment shown the apparatus 100 also includes an elevator 134 for receiving and supporting the plurality of stacked containers 114. The elevator 134 acts as a means for causing displacement between the manipulator 116 and the plurality of stacked containers 114. The elevator 134 is operable to cause the plurality of stacked containers 114 to be elevated until an upper portion of the uppermost container 118 is aligned with the manipulator 116. The elevator 134 is also operable to lower the plurality of stacked containers 114 when separating the containers prior to flipping, such that subsequent containers in the plurality of stacked containers 114 are able to fall back into the stack while the uppermost container 118 is being flipped.

The elevator 134 comprises a lower support 136 for supporting the plurality of stacked containers 114. Referring to FIG. 3A, in the embodiment shown the lower support 136 is removably mounted on a plurality of forks 216, and the plurality of stacked containers 114 are pre-loaded onto the lower support before being received on the forks 216. The apparatus 100 also includes a lower support sensor 218, which produces a signal when the lower support 136 has been received on the plurality of forks 216 and is positioned for loading of the containers 102 into the apparatus 100. The lower support sensor may be implemented using an ultrasonic sensor configured to act as a proximity sensor. In one embodiment the removable lower support 136 may be accommodated on a wheeled frame (not shown) and the lower support may be stacked with containers 102 at various locations where the containers are used and then subsequently wheeled to the apparatus 100 for loading.

Figure 8:
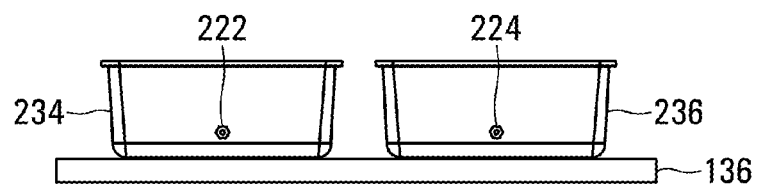
FIG. 8 is an elevational view of a plurality of rat containers on the elevator shown in FIG. 3.
Figure 9:
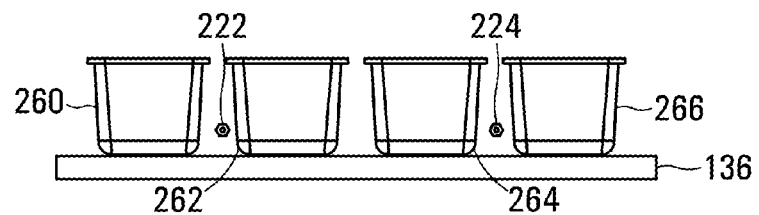
FIG. 9 is an elevational view of a plurality of mouse containers on the elevator shown in FIG. 3.

The elevator 134 also includes a plurality of container type sensors, one of which is shown at 222 in FIG. 3. Referring to FIG. 8, locations of the container type sensors 222 and 224 for one embodiment are shown in relation to two adjacently located rat cages 234 and 236 loaded on the lower support 136. In the embodiment shown, each of the sensors 222 and 224 are implemented using an ultrasonic sensor configured to act as a proximity sensor and would thus receive an echo back from a surface of the cages 234 and 236 when present. Referring to FIG. 9 in the case of four adjacently located mouse cages 260, 262, 264, and 266, the sensors 222 and 224 are disposed between adjacent containers and thus would not detect the presence of the mouse cages. The signals produced by the container type sensors 222 and 224 may thus be interpreted to indicate a type of container 102 that is loaded on the lower support 136 (i.e. whether mouse cages or rat cages are stacked on the lower support 136).

Figure 5:
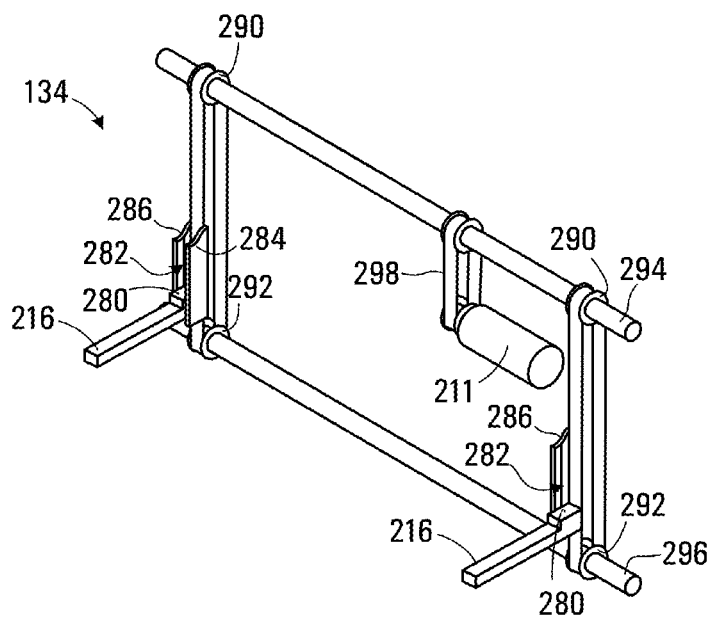
FIG. 5 is a perspective view of the elevator shown in FIG. 3.

The elevator 134 also includes an elevator drive, which is shown in perspective view in FIG. 5. Referring to FIG. 5, the plurality of forks 216 of the elevator 134 each have an end 280 which is slideably received in a channel 282 defined by side plates 284 and 286 (a portion of the side plates 284 and 286 are shown in FIG. 5). The channel 282 constrains each of the forks 216 for vertical movement in within channel 282. The elevator 134 also includes a pair of belts 288 coupled between respective pulleys 290 and 292. The pulleys 290 and 292 are received on respective shafts 294 and 296. The elevator 134 further includes an elevator drive motor 211, which may be implemented using a servo motor. The elevator drive motor 211 is coupled to the shaft 294 via a drive belt 298 for imparting a rotational drive to the shaft 294. The end 280 of each of the forks 216 is coupled to the respective belt 288 and actuation of the elevator drive motor 211 causes the shaft 294 to rotate to advance the belts 288, thus raising or lowering the forks 216.

Figure 7:
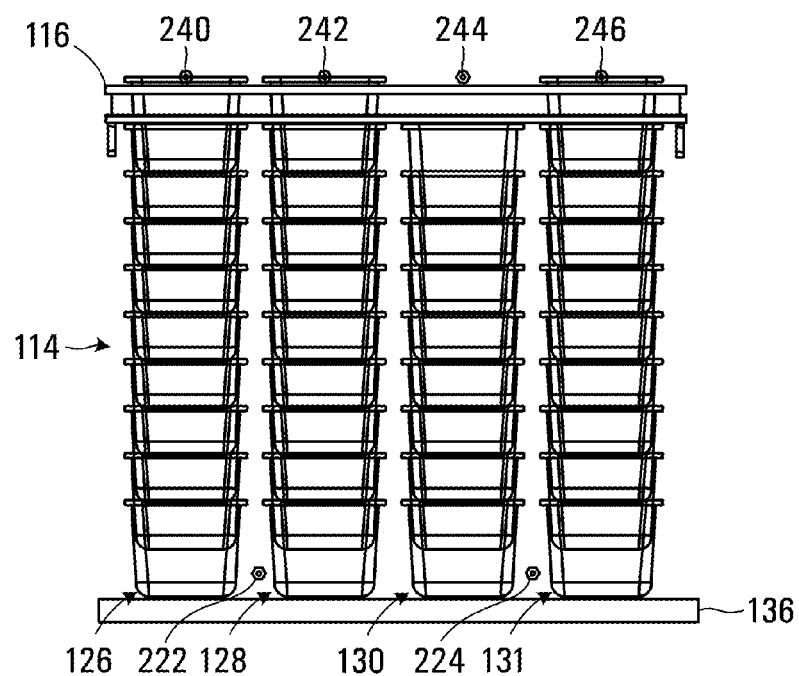
FIG. 7 is an elevational view of the plurality of containers on the elevator shown in FIG. 3.

The elevator 134 also includes a plurality of container stack height sensors, one of which is shown in FIG. 3A at 240. Referring to FIG. 7, locations of the container stack height sensor 240 and remaining sensors 242, 244, and 246 are shown in relation to the plurality of stacked containers 114, which include four adjacently located vertical stacks of containers 126-131. In the embodiment shown the sensors 240-246 are implemented using ultrasonic sensors, which transmit a short burst of ultrasonic sound and measure the time for an echo to return to the sensor for detecting the presence of the respective containers 102 in the stacks 126-131 and thus act as proximity sensors. In the case shown in FIG. 7 an uppermost container in the stack 130 is missing, and accordingly the sensor 244 will produce a signal indicating that a container is not detected at this location. The container stack height sensor signals are used to provide feedback to the controller 132 during the separation and flipping operations by the manipulator 116 as described later herein.

Referring back to FIG. 1, the apparatus 100 also includes a scraper 138, which is operable to scrape the container when it has been flipped over onto the receiving end 112 of the conveyor 110. The scraper 138 is mounted in one of the plurality of openings 120 between the rollers 122 and is actuated by scraper actuation cylinders, one of which is shown in FIG. 1 at 140. The scraper 138 is shown in greater detail in FIG. 6. Referring to FIG. 6A, the scraper 138 includes a frame 400, which supports a plurality of scraper blades 402. The frame 400 is coupled to the scraper actuation cylinders 140, which in this embodiment are each single-ended pneumatically actuated cylinders having respective rods 404 coupled to the frame 400. When the rods 404 of the cylinders 140 are in the un-extended condition, as shown in FIG. 6A, the scraper blades 402 remain within the opening 120 below the conveyor and thus do not impede movement of the containers 102 along the conveyor 110. Referring to FIG. 6B, when the rods 404 of the cylinders 140 are extended, the scraper blades 402 extend upwardly through the opening 120 to engage an inside surface 406 of the base 108 of the container 102. Referring to FIG. 6C, in the embodiment shown each scraper blade 402 includes a pair of blades 408, which are generally vertically oriented prior to engaging the inside surface 406. The scraper blades 402 comprise a resilient material that permits the blades 408 to move apart with respect to each other when the blades engage the inside surface 406 while being extended (as shown in FIG. 6D), thereby scraping waste from the inside surface 406 of the base 108 of the container 102. When retracted the blades 408 again spring back into the generally vertically oriented condition. In the embodiment shown the scraper 138 includes four scraper blades 402 arranged such that each of the containers 102 is engaged by two of the scraper blades. In other embodiments where different sized containers are to be processed, the number and arrangement of the scraper blades 402 may be other than shown to match the different sized container, or a plurality of different sized containers that may be processed. In other embodiments the scraper 138 may be implemented using rigid blades coupled to an alternative actuation system for achieving the scraping function.

Referring back to FIG. 1, the apparatus 100 also includes a reject door 142 that defines a reject location 144 for rejecting containers 102 that have been improperly processed by the manipulator. For example, one or more subsequent containers in the plurality of stacked containers 114 may remain attached to the uppermost container 118 after separating. In such cases the improperly processed containers 102 should be removed from further processing by the apparatus 100 to prevent containers having trapped waste being discharged at the discharge end 127. The reject door 142 is coupled to a reject door actuator cylinder 146 that is configured to open the reject door when it becomes necessary to reject a container. The apparatus 100 further includes a reject actuator 150, which is operably configured to push the rejected containers through the reject door 142. The reject actuator 150 includes a plate 156 coupled to a rodless pneumatic actuator cylinder 158. When actuated by the cylinder 158, the plate 156 engages a side panel of a leftmost container in the row of containers to be rejected and pushes the containers toward the reject door 142. The apparatus 100 further includes a slide plate 152 for guiding the rejected containers over the plurality of rollers 122 to the reject door, such that damage to the o-ring coupling between adjacent rollers 122 is prevented.

In this embodiment, when it is necessary to reject a container, an entire row of containers that were flipped by the manipulator 116 are pushed out of the reject door 142 into a receptacle (not shown) located adjacent to the apparatus 100. The rejected containers may be manually separated and restacked on another lower support 136 for reprocessing by the apparatus 100.

Operation

Figure 10:
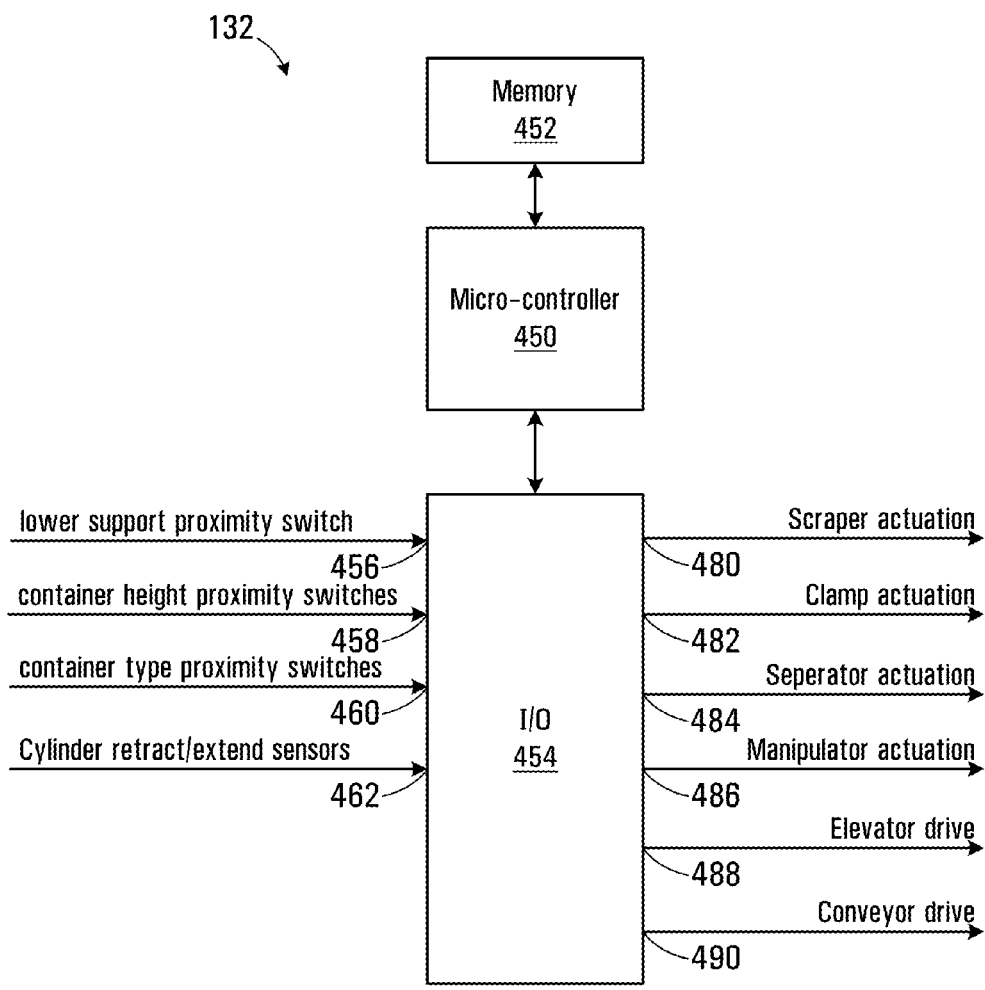
FIG. 10 is a block diagram of a microcontroller circuit for implementing a controller shown in FIG. 1.

The controller 132 is shown in greater detail at in FIG. 10. Referring to FIG. 10, in the embodiment shown the controller 132 includes a microcontroller 450, a memory 452 in communication with the microcontroller, and an input/output I/O interface 454 in communication with the microcontroller. Program codes for directing the microcontroller 450 to carry out various functions are stored in the memory 452. The memory also stores parameters and values used in the operation of the apparatus 100. The memory 452 may be implemented using any of a variety of memory types including RAM, flash memory, a hard drive, for example.

The I/O 454 includes an input 456 for receiving a lower support sensor signal, a plurality of inputs 458 for receiving container stack height sensor signals, and a plurality of inputs 460 for receiving container type sensor signals.

The I/O 454 further includes a plurality of inputs 462 for receiving signals indicating successful extension or retraction of the actuators such as the various cylinder actuators described above. Such signals may be provided by sensors, such as magnetic reed switches disposed to detect the position of the various cylinder rods.

The I/O 454 further includes an output 480 for producing a scraper actuation signal for actuating the pair of scraper actuation cylinders 140 to selectively extend or retract, an output 482 for producing a clamp actuation signal for actuating the pair of clamp actuation cylinders 300 to selectively extend or retract, an output 484 for producing a separator actuation signal for actuating the pair of separator actuator cylinders 326 to selectively extend or retract, and an output 486 for producing a manipulator actuation signal for actuating the manipulator actuator 111. The I/O 454 further includes an output 488 for producing a drive signal for actuating the elevator drive motor to either raise or lower the elevator 134, and an output 490 for controlling conveyor drive to the driven rollers 122 that make up the conveyor 110.

In other embodiments (not shown), the controller 132 may be partly or fully implemented using a hardware logic circuit including discrete logic circuits and/or an application specific integrated circuit (ASIC).

Figure 11:
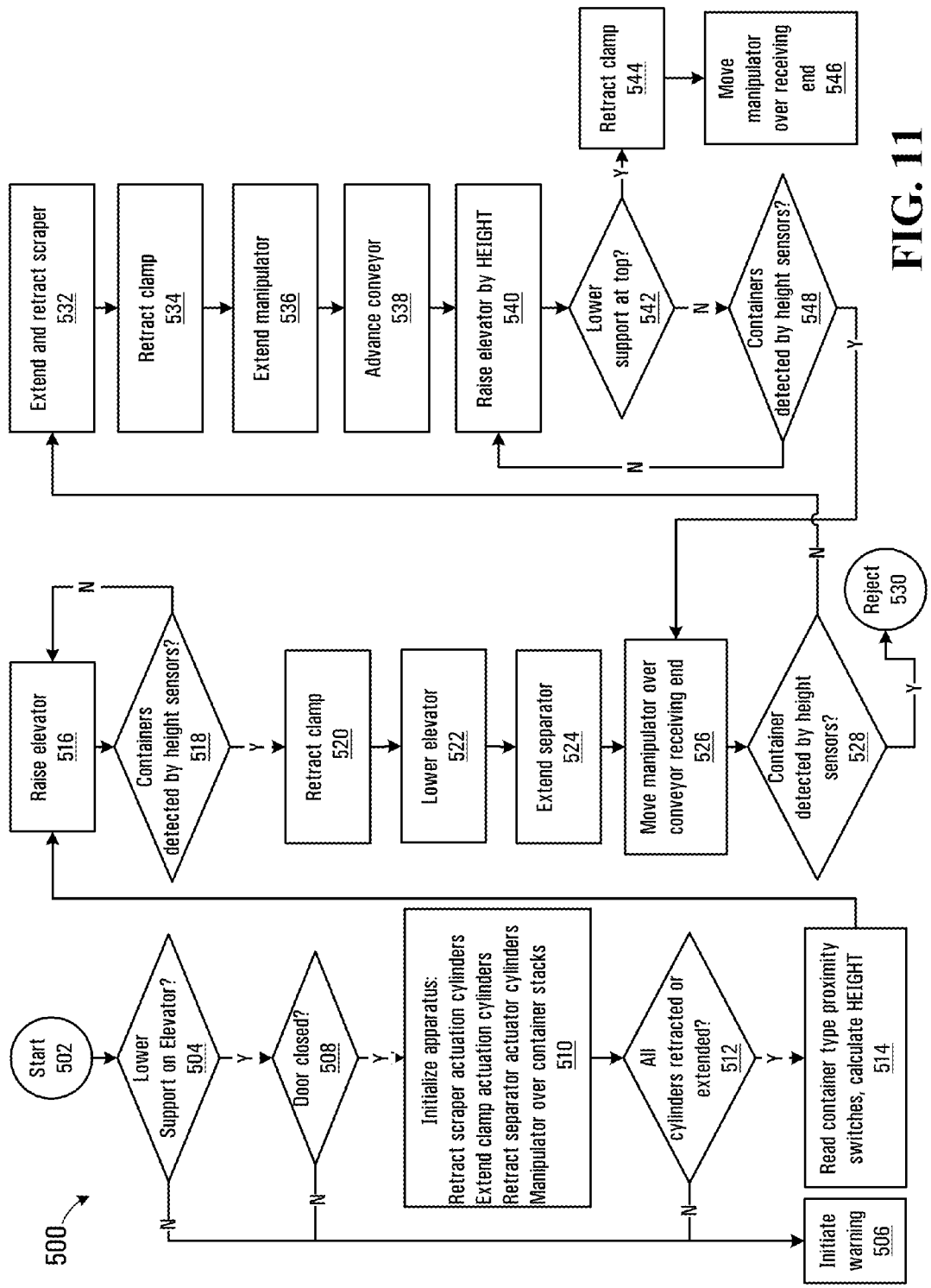
FIG. 11 is a flowchart of a process executed by the microcontroller shown in FIG. 1 for operating the apparatus to process containers.

Referring to FIG. 11, a flowchart depicting blocks of code for directing the microcontroller 450 to control operations of the apparatus 100 is shown generally at 500. The blocks generally represent codes that may be read from the memory 452 for directing the microcontroller to perform various functions. The actual code to implement each block may be written in any suitable program language, such as C, C++, ladder logic, and/or assembly code, for example.

Prior to commencing the process 500, the door 155 of the apparatus 100 is opened and an operator maneuvers the lower support 136 carrying the plurality of stacked containers 114 on a wheeled frame up to the apparatus for loading of the stacked containers onto the forks 216. The process 500 then commences at block 502. Block 504 directs the microcontroller 450 to read the signal provided by the lower support sensor 218 at the input 456 of the I/O 454 and to determine whether the lower support 136 is fully engaged on the elevator 134, in which case the process continues at block 508. Block 508 directs the microcontroller 450 to close the door 155 and to read a signal at the input 462 indicating that the door is closed. At this time the blower in communication with the waste receptacle 124 and the auger is also activated.

The process then continues at block 510, which directs the microcontroller 450 to produce a signal at the output 480 cause the actuation cylinders 140 of the scraper 138 to be retracted to move the scrapers below the level of rollers 122 of the conveyor 110. Block 510 further directs the microcontroller 450 to produce a signal at the output 482 cause the clamp actuation cylinders 300 to be extended to cause the first and second clamp bars 302 and 304 of the manipulator 116 to open to engage the containers 102. Block 510 also directs the microcontroller 450 to produce a signal at the output 482 to cause the separator actuator cylinders 326 to retract, and to produce a signal at the output 486 to cause the manipulator actuator 111 to cause the manipulator 116 to move into position over the plurality of stacked containers 114 for engaging the uppermost container 118.

Block 512 then directs the microcontroller 450 to read the inputs 462 to determine whether the various cylinders actuated in block 510 have been successfully retracted or extended. Should a blockage in the apparatus 100 impede the actuation of any of the cylinders, such a fault would be detected at block 512. If at any of blocks 504, 508, and/or 512, a fault is detected, the process continues at block 506, which executes a fault handling process and/or provides a warning to the operator of the fault condition. For example, a fault condition could be indicated by causing a warning light 160 (shown in FIG. 1) to be actuated.

The process 500 then continues at block 514, which directs the microcontroller 450 to read the signals provided at the inputs 460 by the container type sensors 222 and 224. As described above in connection with FIG. 7 and FIG. 8, the container type sensors 222 and 224 permit the type of container (i.e. rat or mouse cages) to be determined. Standard dimensions for the various containers may be stored in the memory 452, which may be accessed to determine a HEIGHT parameter for the container being processed. In this embodiment the HEIGHT parameter represents the overall height of the containers being process and is stored in the memory 452 as a current operating parameter.

Block 516 then directs the microcontroller 450 to raise the elevator 134 by producing a signal at the output 488 to cause the elevator drive motor 211 to be actuated. Block 518 then directs the microcontroller 450 to read the signals provided at the inputs 458 by the container stack height sensors 240-250. If the signals received at the inputs 458 do not indicate the proximity of the containers, then block 518 directs the microcontroller 450 back to block 516 and the elevator 134 is further raised by again actuating the elevator drive motor 211.

If at block 518, the signals received at the inputs 458 indicate that the containers have been detected the process continues at block 520. At this time the manipulator 116 is positioned over the containers as shown in FIG. 4, and the first and second clamp bars 302 and 304 are disposed to engage the container under the lip 306. Block 520 directs the microcontroller 450 to produce a signal at the output 482 to cause the clamp actuation cylinder to retract to engage the containers.

Block 522 then directs the microcontroller 450 to produce a signal at the output 488 to cause the elevator drive motor 211 to lower the elevator 134, causing the plurality of stacked containers 114 to be lowered. Under these conditions the uppermost containers 118 are held by the clamp bars 302 and 304 of the manipulator 116, and the subsequent containers 312 are likely to drop down into the plurality of stacked containers 114 under their own weight. However in some circumstances one or more of the subsequent containers 312 may be stuck within the uppermost container 118. Block 524 then directs the microcontroller 450 to produce a signal at the output 484 to cause the separator actuation cylinders 326 to extend. Referring back to FIG. 4, the pair of separator bars 322 and 324 engage the lip 313 of subsequent containers 312 that remain attached to the uppermost container during separating causing the subsequent container to be forcefully separated from the uppermost container.

The process 500 then continues at block 526, which directs the microcontroller 450 to produce a signal at the output 486 to cause the manipulator actuator 111 to be actuated to flip the containers over onto the receiving end 112 of the conveyor 110. Block 528 then directs the microcontroller 450 to read the signals at the inputs 458 to determine whether any containers are detected. If for some reason the separating mechanism 320 fails to separate all of the containers at block 524, a missing container (such as the missing container in the stack 130 in FIG. 7) would be detected at block 528, which would then direct the microcontroller 450 process the flipped containers at the receiving end of the conveyor in accordance with a reject process 530. If no missing containers are detected at block 528, the process continues at block 532.

At block 526, once the containers have been flipped over onto the receiving end 112 of the conveyor 110, loose waste in the containers 102 would then fall through the opening 120 to be collected in the waste receptacle 124 and removed by operation of the auger and the air flow. However, some of the waste may remain stuck to inside surface 406 of the base 108 of the container 102. Block 532 then directs the microcontroller 450 to produce a signal at the output 484 to cause the scraper 138 to be actuated, as previously described with reference to FIGS. 5A-5D thus scraping remaining waste from the inside surface 406 of the container. Block 532 also directs the microcontroller 450 to retract the scraper 138 on completion of the scraping operation. Block 534 then directs the microcontroller 450 to produce a signal at the output 482 to cause the clamp actuation cylinder 300 to extend to release the containers. The process then continues at block 536, which directs the microcontroller 450 to produce a signal at the output 486 to cause the manipulator actuator 111 to move the manipulator away from the receiving end 112 of the conveyor 110 to allow the containers to advance along the conveyor 110. Block 538 then directs the microcontroller 450 to produce a signal at the output 490 to impart a drive to driven rollers of the plurality of rollers 122 to cause the containers 102 to be transported along the conveyor 110, past the reject location 144 and on to the discharge end 127 of the conveyor, where the containers are discharged from the apparatus 100.

The process then continues at block 540, which directs the microcontroller 450 to raise the elevator 134 by producing a signal at the output 488 to cause the elevator drive motor 211 to be actuated to raise the container by the earlier determined HEIGHT parameter. Block 542 then directs the microcontroller 450 to determine whether the lower support 136 has been raised to the elevator uppermost reach, which would indicate that all containers in the plurality of stacked containers 114 have been flipped and processed. In the embodiment shown, when all containers have been flipped the lower support 136 is also processed through the apparatus 100 so that any waste may be removed from the support. The lower support 136 may be washed in a subsequent washer processing apparatus, if provided. Block 544 then directs the microcontroller 450 to produce a signal at the output 482 to cause the clamp actuation cylinder to retract to engage the lower support 136 and block 546 directs the microcontroller 450 to produce a signal at the output 486 to cause the manipulator actuator 111 to flip the lower support over onto the receiving end 112 of the conveyor 110 where it is transported to the discharge end 127 of the conveyor and discharged from the apparatus 100.

If at block 542, the lower support is not at the top of the elevator 134, then the process continues at block 548, which directs the microcontroller 450 to determine whether containers are detected by the height sensors, in which case block 542 directs the microcontroller 450 back to block 526 and the blocks 526-542 are repeated. If at block 548 the containers are not detected by the height sensors, block 548 directs the microcontroller 450 back to block 540 and the elevator is raised and blocks 540 and 542 are repeated until the lower support 136 has been raised to the elevator uppermost reach.

Figure 12:
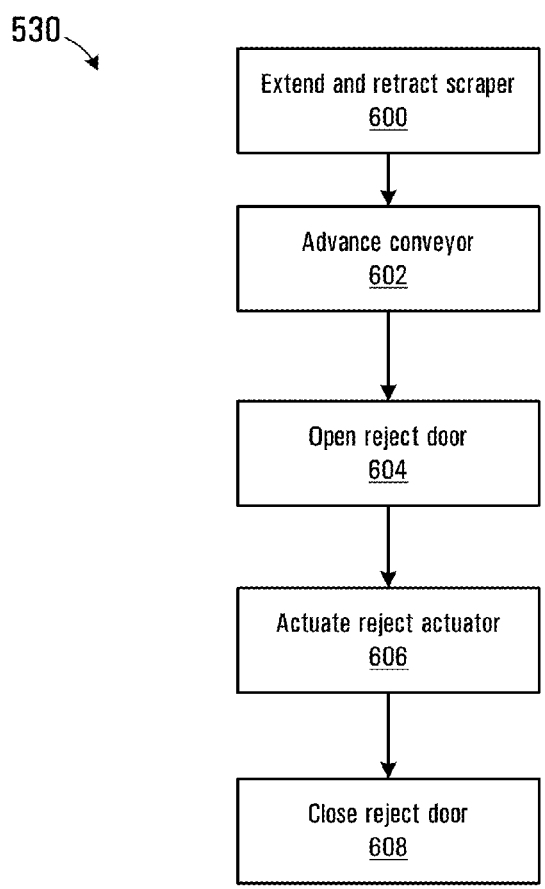
FIG. 12 is a flowchart of a process executed by the microcontroller shown in FIG. 1 for operating the apparatus to reject containers.

The reject process 530 is shown in detail in FIG. 12. Referring to FIG. 12, block 600 directs the microcontroller 450 to actuate the scraper 138 as described above in reference to block 532 to scrape the container inner surfaces 406. Due to at least two stacked containers being present at the receiving end 112 of the conveyor 110, waste will be trapped between the stacked containers and will not fall out or be scraped by the scraper 138. Block 602 directs the microcontroller 450 to actuate the conveyor 110 to transport the containers to be rejected to the reject location 144, and block 604 directs the microcontroller 450 to retract the reject door actuator cylinder 146 to open the reject door 142. The process 530 then continues at block 606, which directs the microcontroller 450 to actuate the reject actuator 150 to cause the rejected containers to be pushed out of the reject door 142. The reject process 530 completes at block 608, which directs the microcontroller 450 to extend the reject door actuator cylinder 146 to close the reject door 142.

Advantageously, the apparatus 100 described above is capable of processing a large number of containers to remove soiled bedding and waste in a manner that reduces the possibility of release of containments into the environment. The apparatus may be configured to process a variety of different containers and to determine the type of containers being loaded. The manipulator 116 facilitates rapid flipping of multiple containers, while simultaneously reducing the probability that multiple containers remain stuck together.

While specific embodiments of the invention have been described and illustrated, such embodiments should be considered illustrative of the invention only and not as limiting the invention as construed in accordance with the accompanying claims.

What is claimed is:

1. An apparatus for removing waste from a soiled container, the container having an opening and being operable to house laboratory animals, the apparatus comprising:
   a conveyor having a receiving end for receiving containers from a plurality of stacked containers, the plurality of stacked containers being disposed such that the opening is upwardly oriented;
   a manipulator operable to align with and to engage an uppermost container of said plurality of stacked containers, said manipulator being further operable to cause said uppermost container to be separated from said plurality of stacked containers and to cause said uppermost container to be flipped over onto said receiving end of said conveyor such that the opening is downwardly disposed, said conveyor having a plurality of openings for permitting waste discarded from the container to fall through said openings;
   a waste receptacle disposed below said conveyor for collecting the discarded waste; and
   said conveyor being operable to advance to transport said uppermost container away from said receiving end toward a discharge end of said conveyor.

2. The apparatus of claim 1 wherein said plurality of stacked containers comprise a plurality of stacked containers in more than one adjacently located vertical stack and wherein said manipulator is operable to cause uppermost containers from each of said adjacently located vertical stacks to be simultaneously separated from said plurality of stacked containers and flipped over onto said receiving end of said conveyor.

3. The apparatus of claim 2 further comprising a controller operably configured to:
   determine whether an uppermost container in one of said more than one adjacently located vertical stacks is missing before causing said manipulator to align with and to engage an uppermost container of said plurality of stacked containers;
   cause an operator alert to be initiated; and
   pause operation of the conveyor when the containers have been transported to said discharge end of said conveyor to facilitate insertion of a container in place of said missing container.

4. The apparatus of claim 3 wherein said controller is operably configured to determine whether said uppermost container is missing in response to receiving a proximity signal associated with each vertical stack when said uppermost container is present in said vertical stack.

5. The apparatus of claim 1 wherein said manipulator is configured to pivot about a pivot location disposed proximate said receiving end of said conveyor such that the uppermost container is moved in an arc away from a subsequent container in the plurality of stacked containers toward said receiving end of said conveyor.

6. The apparatus of claim 1 wherein said manipulator comprises a separating actuator operable to extend to cause a subsequent container in said plurality of stacked containers to be forcefully separated from said uppermost container when said subsequent container remains attached to said uppermost container during said separating.

7. The apparatus of claim 6 further comprising means for causing displacement between said manipulator and said plurality of stacked containers.

8. The apparatus of claim 7 wherein said means for causing displacement between said manipulator and said plurality of stacked containers comprises means for lowering said plurality of stacked containers.

9. The apparatus of claim 1 further comprising a controller operably configured to:
   determine whether one or more subsequent containers in the plurality of stacked containers remain attached to said uppermost container after said separating; and
   cause said one or more subsequent containers and said uppermost container to be received at the receiving end of the conveyor and transported to a reject location along the conveyor.

10. The apparatus of claim 9 wherein said controller is operably configured to determine whether said one or more subsequent containers in the plurality of stacked containers remain attached by receiving a signal from a sensor disposed to sense the presence of said one or more subsequent containers.

11. The apparatus of claim 9 further comprising a door disposed to one side of said conveyor at said reject location for ejecting said one or more subsequent containers and said uppermost container.

12. The apparatus of claim 11 further comprising an ejector actuator operably configured to push said one or more subsequent containers and said uppermost container through said reject door.

13. The apparatus of claim 1 further comprising an elevator operable to cause said plurality of stacked containers to be elevated until an upper portion of said uppermost container is aligned with said manipulator.

14. The apparatus of claim 13 further comprising a sensor disposed at a height proximate said manipulator and being operable to generate a signal when said upper portion of said uppermost container is aligned with said manipulator.

15. The apparatus of claim 1 further comprising an auger disposed in the waste receptacle and being operable to cause the discarded waste to be removed from the waste receptacle.

16. The apparatus of claim 15 wherein said waste receptacle comprises an exhaust port in fluid communication with said waste receptacle and further comprising a blower operable to cause a flow of air to be drawn through said exhaust port to prevent waste from escaping into a surrounding environment.

17. The apparatus of claim 16 further comprising a housing enclosing said conveyor, and wherein said flow of air is further operable to cause a negative pressure within said housing.

18. The apparatus of claim 1 further comprising a scraper operably configured to engage at least a surface of the container that is disposed opposite the opening, the scraper being operable to remove waste from said at least said surface.

19. The apparatus of claim 18 further comprising a controller operably configured to cause said uppermost container to be flipped over onto said receiving end of said conveyor while motion of said conveyor is halted and wherein said controller is operably configured to:
   cause said manipulator to hold the container in the flipped over orientation on said receiving end of said conveyor; and
   cause a scraper blade to be extended through one of said openings in said conveyor to engage said surface.

20. The apparatus of claim 19 wherein said scraper blade comprises a resilient scraper blade.

21. The apparatus of claim 19 wherein said resilient scraper blade comprises a scraper blade having a pair of generally vertically oriented resilient blades, said resilient blades being operably configured to engage said surface and move apart with respect to each other while being extended thereby scraping said surface.

22. A system for cleaning soiled containers, the system comprising: an apparatus for removing waste from a soiled container, the container having an opening and being operable to house laboratory animals, the apparatus comprising: a conveyor having a receiving end for receiving containers from a plurality of stacked containers, the plurality of stacked containers being disposed such that the opening is upwardly oriented; a manipulator operable to align with and to engage an uppermost container of said plurality of stacked containers, said manipulator being further operable to cause said uppermost container to be separated from said plurality of stacked containers and to cause said uppermost container to be flipped over onto said receiving end of said conveyor such that the opening is downwardly disposed, said conveyor having a plurality of openings for permitting waste discarded from the container to fall through said openings; a waste receptacle disposed below said conveyor for collecting the discarded waste; and said uppermost conveyor being operable to advance to transport said container away from said receiving end toward a discharge end of said conveyor; and further comprising at least one feature selected from the group consisting of:
   a washer apparatus disposed to receive said containers from said discharge end of said conveyor for washing the containers;
   a drier apparatus disposed to receive said washed containers from said washer apparatus and to cause said containers to be dried; and
   a bedding dispenser apparatus, disposed to receive said dried containers, and operable to flip the containers to cause the opening to be upwardly disposed for receiving a bedding material.

* * * * *